May 17, 1960 H. ULANET 2,937,255
TEMPERATURE CONTROL
Filed Oct. 23, 1957 2 Sheets-Sheet 1

WITNESSES
Ann Ulanet
George Ulanet

INVENTOR
HERMAN ULANET
BY
Milo H. Hutchinson
ATTORNEY

May 17, 1960  H. ULANET  2,937,255
TEMPERATURE CONTROL
Filed Oct. 23, 1957  2 Sheets-Sheet 2

INVENTOR.
HERMAN ULANET
BY
Milo H. Hutchinson
ATTORNEY

United States Patent Office 2,937,255
Patented May 17, 1960

2,937,255

TEMPERATURE CONTROL

Herman Ulanet, Maplewood, N.J.

Application October 23, 1957, Serial No. 691,849

2 Claims. (Cl. 200—137)

This invention relates to a means for the automatic control of the temperature of a body in which the body itself is one component of the control.

Formerly, thermostats have been used for this purpose, one type utilizing a bimetallic element for opening a pair of electrical contacts when a predetermined temperature is reached, and another type, the differential thermostat, opening the contacts by means of the differential expansion of two metallic components. Usually, the component having the highest coefficient of expansion is in thermal contact with the body the temperature of which is to be controlled. But, however tightly the bimetallic element of a bimetallic thermostat or the component of highest coefficient of expansion of a differential type thermostat is secured to the body the temperature of which is to be controlled, there is a temperature drop from the body to the thermal sensing element due to the oxides which form on the mating surfaces.

The temperature drop between the body and the thermal sensing element causes a lag in heat transfer during which heat is accumulated in the body. By the time the contacts open, the accumulated heat causes the temperature of the body to overshoot the temperature for which the thermostat has been set.

This phenomenon, in many cases, such as the electric flatiron, may be both dangerous and damaging. Where the flatiron has a cast-in element in an aluminum sole plate, the fabric being ironed will be burned if the user starts ironing at the time of the temperature overshoot.

It is an object of the instant invention to provide an automatic temperature control device in which the expansion of the body itself serves to control the temperature thereof.

A further object is to create a temperature control device which is independent of the high expansion component of known thermostats.

An additional object is to provide a temperature control device suitable for use with either normally open or closed contact members.

Another object is to create a temperature control device adapted to other than electric circuits.

It is also an object of the instant invention to provide means for preventing the contact points of spring contact members from sticking together.

Other objects of the instant invention will become apparent in the course of the following detailed description.

In the attainment of the aforesaid objectives, subject temperature control is made in five embodiments. In each embodiment, the differential in expansion between a body the temperature of which is to be controlled and an intermediate member secured to the body motivates the control. In the first three and fifth embodiments, an upright arched member on the body is the intermediate member while in the fourth embodiment a link replaces the arched member. In the first embodiment, one of a pair of normally closed spring contact members is spring loaded toward and in operable engagement with the arched member. The second embodiment is like the first except that one of the pair of spring contact members is secured to the arched member. The third embodiment is also like the first except that normally open spring contact members are used. The fourth embodiment differs from the first three not only in the use of a link rather than an arched member but also in the use of a resilient member in conjunction with the link. The fifth embodiment is similar to the first three in that an arched member is used but differs in that the pistons of a valve are actuated for the control of the heat source rather than spring contact members in an electric circuit with an electric heating element.

The invention will appear more clearly from the following detailed description when taken in conjunction with the accompanying drawings showing by way of example the preferred embodiments of the inventive concept.

Figure 1:
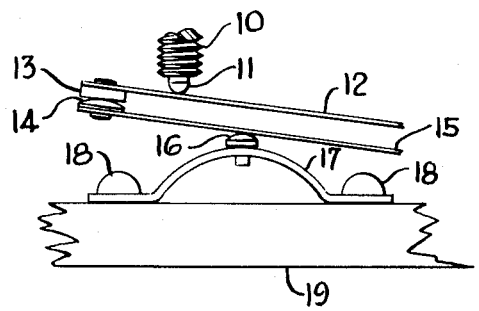
Figure 1 shows the first embodiment of the temperature control device and is a fragmentary schematic view thereof constructed in accordance with the principles of this invention.
Figure 6:
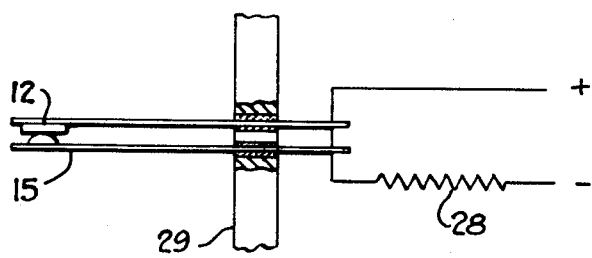
Figure 6 is a wiring diagram showing the connections of a pair of spring contact members in a circuit with an electric heating element and a source of electrical energy.

Referring now to the first embodiment of the temperature control device shown in Figure 1, reference numeral 19 indicates the body the temperature of which is to be controlled, for example by the electric heating element 28 (Fig. 6). Numeral 17 shows the intermediate or arched member. Suitable fasteners 18 secure the arched member upright on the body 19. There will be a variable loss of heat transfer from the body 19 to the arched member 17 dependent upon the method of fastening. Conceivably, the heat lost in transfer may be such that both the body 19 and the arched member 17 could have the same coefficient of expansion or the arched member even a greater coefficient of expansion. However, if the loss of heat transfer is at a minimum, the arched member in this case has a lower coefficient of expansion than the body. On the other hand, if the arched member has a higher coefficient of expansion than the body, the device could be used for closing normally open contact members rather than for opening the normally closed contact members illustrated. The electric heating element 28 as shown in Figure 6 could be inserted directly in the body 19 or the body 19 could be used as a thermal sensing element with the heating element in close proximity.

Secured substantially at the apex of the arched member 17 and extended forwardly thereof is an electrical insulator 16 of any suitable material.

In spaced relationship with the insulator 16 is a pair of normally closed spring contact members indicated by the reference numerals 12 and 15, the contact member 15 being spring loaded toward and in operable engagement with the insulator 16 secured to the arched member. The contact members at one end, on the right in Fig. 1, are fastened to any suitable support, for example 29 (Fig. 6). On the opposite or free end of the contact member 12 is the contact point 13, and on the free end of the contact member 15 the contact point 14. The contact points are normally closed, as illustrated, and the desired temperature for opening the points is regulated by the adjustment screw 10 threaded through any support, not illustrated. In the tip of the screw 10 is an electrical insulator 11 which is in operable engagement with the contact member 12.

In operation: Upon heating, the body 19 will expand. Either through a loss of heat transfer or a lower coefficient of expansion, as desired, the apex of the intermediate or arched member 17 will be lowered and carry downwardly the insulator 16. Contact member 15, being spring loaded toward the apex or insulator 16, will follow downwardly until the contact points 13 and 14 separate and break the circuit (Fig. 6) through the electric heating element 28 (Fig. 6).

Figure 2:
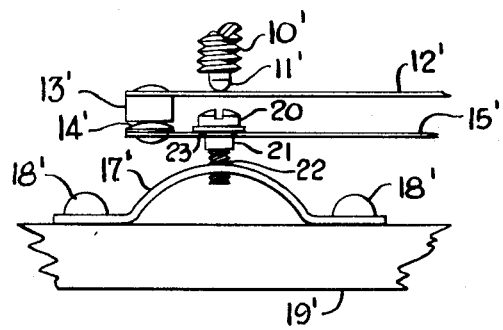
Figure 2 shows the second embodiment and is also a fragmentary schematic view.

Referring now to the second embodiment of the temperature control device shown in Figure 2, reference numeral 19' indicates the body the temperature of which is to be controlled when heated by a known electric heating element as in the first embodiment. Of course, the body 19' could be a thermal sensing element for the control of a heat source other than an electric heating element. Numeral 17' indicates the intermediate or arched member secured to the body 19' by any suitable fasteners 18'.

The spring contact members 12' and 15' with the contact points 13' and 14', respectively, are similar to those described in the first embodiment. The adjustment screw 10' with the electrical insulator tip 11' is also like that of the first embodiment and is likewise used for the regulation of the contact pressure of the contact points 13' and 14', and hence the desired temperature for opening the circuit through an electric heating element in heat transfer relationship with the body 19' or for regulating the intensity of another heat source.

The contact points of the previously described first embodiment could stick together and damage some of the components or even the material that is being heated or both as, for example, in the case of a flatiron. To prevent such accidents, one of the contact members, 15', is fastened to the apex of the arched member 17' by a screw 20 which is electrically insulated from the contact member 15' by the insulator bushing 21 inserted through an opening 23 in the contact member 15' and then threaded into the apex of the arched member as at 22.

In operation: When the apex of the arched member moves downwardly as the body 19' expands under rising temperature, it will draw with it the contact member 15' to separate the contact points 13' and 14' if stuck or frozen together for any reason.

Figure 3:
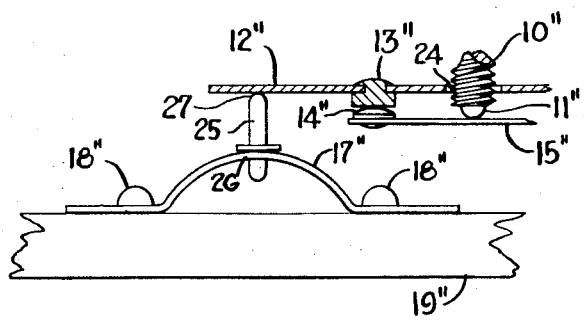
Figure 3 shows the third embodiment and is likewise a fragmentary schematic view.

Referring now to the third embodiment shown in Figure 3, the reference numeral 19" indicates the body the temperature of which is to be regulated when heated by an electric heating element or otherwise as in the first embodiment, and 17" the intermediate or arched member which is fastened to the body 19" by any suitable means such as the fasteners 18".

Reference numerals 12" and 15" indicate the normally open spring contact members, the free ends of which are equipped with the contact points 13" and 14", respectively.

As in the previously mentioned embodiments, the pressure of the contact points 13" and 14" and the temperature at which the points will close may be varied by the adjustment screw 10" which passes through an opening 24 in the contact member 12" and is electrically insulated therefrom. In the tip of the screw 10" is an electrical insulator 11" in operable engagement with the contact member 15".

While the contact points 13" and 14" are illustrated in the closed position, that is after the body has been heated, they are normally open. The free end of the contact member 12" protrudes beyond the free end of the contact member 15". In operable engagement with the protruding end of the contact member 12" as at 27 is an electrical insulator 25. The free end of the insulator 25 is fitted into the apex of the arched member as at 26 and may or may not be fastened therein as desired.

In operation: When the temperature of the body 19" rises, the apex of the arched member 17" will fall and the contact member 12" being spring loaded against the insulator 25 will follow to permit the contact points 13" and 14" to close as shown and complete the circuit for an alarm such as a pilot light, bell, solenoid valve, magnetic relay, or the like which are not shown in the drawings.

Figure 4:
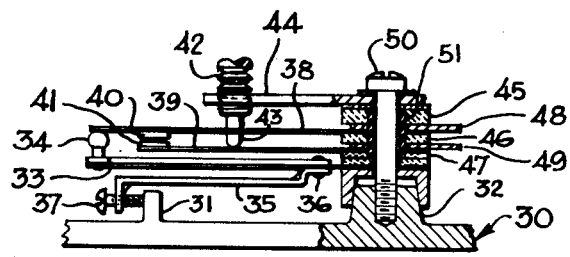
Figure 4 shows the fourth embodiment and is a side elevational view partially in section.

Referring now to the fourth embodiment shown in Figure 4, reference numeral 30 indicates a body or thermal sensing element the temperature of which is to be controlled when heated directly or indirectly by an electric heating element as in the previously mentioned embodiments.

On the body 30 are two spaced and upwardly directed shoulders 31 and 32 which may be formed integral therewith or otherwise.

A resilient member 33 is secured at one end to the shoulder 32 and extended therefrom in spaced and substantially parallel arrangement with the body 30. On the free end of the resilient member 33 is an upwardly directed electrical insulator 34.

Between the resilient member 33, adjacent the fixed end thereof, and the shoulder 31 is a substantially rigid link or intermediate member 35 which, at the end adjacent the shoulder 32, is fastened to the resilient member 33 by any suitable means 36. The free end of the link 35 is turned downwardly and has a thumb screw 37 threaded therethrough with the inner end in adjustable engagement with the shoulder 31.

In upwardly spaced arrangement with the resilient member 33 are the spring contact members 38 and 39 with the normally closed spring contact points 40 and 41, respectively. Both contact members are fixed at one end to the shoulder 32 and electrically insulated from each other and the shoulder. The free end of the contact member 38 protrudes beyond the free end of the contact member 39 and is in operable engagement with the previously mentioned electrical insulator 34.

An adjustment screw 42 is threaded through a support 44 and passes through and is electrically insulated from the spring contact member 38. An insulating tip 43 in the end of the screw 44 is thus brought into adjustable engagement with the spring contact member 39 when regulating the pressure of the contact points for the desired opening temperature. One end of the support 44 is attached to the shoulder 32 from which it is electrically insulated as well as from the other components. Reference numerals 45, 46, and 47 indicate electrical insulators utilized for such insulation purposes while 48 and 49 indicate conductors from the contact members to any suitable source of electrical energy. The fixed ends of the support 44, spring contact members 38 and 39, and the resilient member 33 are assembled with the insulators as illustrated and then secured to the shoulder 32 with the screw 50 threaded therein or the like. The screw 50 is electrically insulated by the insulating sleeve 51.

In operation: As the temperature of the body 30 rises, the shoulder 31 will force the end of the link 35 in engagement therewith outwardly so that a downward thrust is exerted on the resilient member 33 adjacent the fixed end thereof. Such thrust will cause the free end of the resilient member to move upwardly to the extent that the insulator 34 will separate the contact points 40 and 41 to break the circuit through the heating element used to raise the temperature of the body 30.

Figure 5:
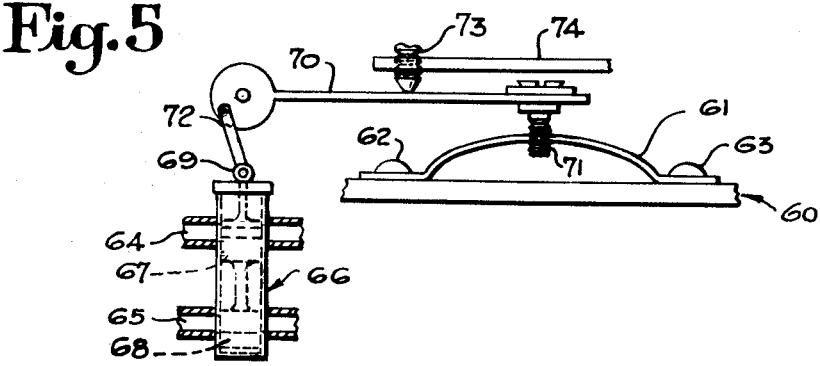
Figure 5 shows the fifth embodiment and is a side elevational view thereof.

Referring now to the fifth embodiment shown in Figure 5, numeral 60 indicates the body to be temperature controlled. For example, the body may be a tank which is heated by hot water or steam flowing through a pipe 64. From the tank, a pipe 65 may conduct the cooled water or steam condensate back to the heat source for reheating. Interposed between the pipes 64 and 65 is a valve mechanism 66 constituted of two pistons 67 and 68 reciprocated by a piston rod 69 in a cylinder. The position of the valve mechanism is angular to the plane of the body 60.

Reference numeral 61 indicates an intermediate or arched member as in the first three embodiments, the arched member being fastened upright on the body 60 by any known fasteners 62 and 63. The arched member 61 further has a lower coefficient of expansion than the body 60.

An arm 70 is fastened at one end to the apex of the arched member by the linkage screw 71. The opposite end of the arm 70 is pivotally attached to any suitable support not shown in the drawings. The arm 70 is further held in the desired position by an adjustment screw 73 threaded through a support 74 which may be attached to any suitable upright, not shown.

In operation: As the temperature of the body 60 rises it will expand. But, the apex of the arched member 61 which has a lower coefficient of expansion than the body will drop downwardly turning the pivoted end of the arm 70 clockwise. A piston rod extension 72, pivotally connected at one end to the arm 70, as illustrated, and at the opposite end pivotally connected to the piston rod 69 will draw the pistons 67 and 68 upwardly to close the heat supply pipe 64 and open the cold return pipe 65.

While only five embodiments of the temperature control have been illustrated and described, still other forms are possible within the scope of the appended claims.

What is claimed is:

1. A temperature control device comprising, in combination, a body with two spaced upright shoulders, a resilient member fixed at one end to one shoulder and in spaced relationship with the second shoulder, a link fixed at one end to the resilient member adjacent the first mentioned shoulder and at the opposite end secured to the second mentioned shoulder, the link and the body having different rates of expansion per degree temperature rise, a pair of normally closed spring contact members fixed at one end to the first mentioned shoulder and in outwardly spaced relationship with the resilient member, means for electrically insulating the spring contact members from each other and from the resilient member at the fixed ends thereof and with the free end of one contact member protruding beyond the other, an electrical insulator disposed upright on the free end of the resilient member and in operable engagement with the protruding end of the contact member, and means for varying the pressure of the contact members.

2. A temperature control device according to claim 1 in which the means for varying the pressure of the contact members comprises an adjustment screw threaded through the support, and an insulating tip for the screw through one contact member and in operable engagement with the other contact member.

References Cited in the file of this patent
UNITED STATES PATENTS

| | | |
|---|---|---|
| 1,963,655 | Fichtner | June 19, 1934 |
| 1,979,471 | Knopp | Nov. 6, 1934 |
| 2,248,666 | Fischer | July 8, 1941 |
| 2,584,924 | Reingruber et al. | Feb. 5, 1952 |
| 2,662,155 | Holmes | Dec. 8, 1953 |
| 2,743,665 | Gustafson | May 1, 1956 |
| 2,820,129 | Long et al. | Jan. 14, 1958 |